United States Patent [19]
Cheesman et al.

[11] Patent Number: 5,489,378
[45] Date of Patent: Feb. 6, 1996

[54] DIFFERENTIAL RELIEF MECHANISM FOR A TRAVELING WATER SCREEN

[75] Inventors: Robert R. Cheesman, Waukesha; James C. VanRoo, Oconomowoc; Ronald L. Sinclair, Milwaukee; James T. Heinen, Pewaukee, all of Wis.

[73] Assignee: Envirex Inc., Waukesha, Wis.

[21] Appl. No.: 163,657

[22] Filed: Dec. 6, 1993

[51] Int. Cl.⁶ .................................................. B01D 33/80
[52] U.S. Cl. .......................... 210/90; 210/130; 210/160; 210/433.1; 210/456
[58] Field of Search ........................... 210/90, 130, 156, 210/157, 160, 161, 162, 247, 400, 418, 420, 433.1, 434, 456, 790, 155, 232, 236, 237, 359

[56] References Cited

U.S. PATENT DOCUMENTS

| | | | |
|---|---|---|---|
| 511,798 | 1/1894 | Rankine | 210/130 |
| 682,994 | 9/1901 | Parsons | 210/161 |
| 1,903,774 | 4/1933 | Burrell | 210/130 |
| 2,339,295 | 9/1943 | Reagan | 210/156 |
| 3,534,856 | 10/1970 | Marsh | 210/126 |
| 3,883,430 | 5/1975 | Codo | 210/132 |
| 4,064,048 | 12/1977 | Downs et al. | 210/160 |
| 4,127,484 | 11/1978 | Walulik et al. | 210/130 |
| 4,137,062 | 1/1979 | Mullerheim et al. | 71/9 |
| 4,286,659 | 9/1981 | Bolding, Jr. | 166/205 |
| 4,935,131 | 6/1990 | Pindar | 210/161 |
| 5,008,007 | 4/1991 | Anderson | 210/111 |
| 5,024,804 | 6/1991 | Blaushild | 376/285 |
| 5,045,188 | 9/1991 | Tsai | 210/136 |
| 5,112,476 | 5/1992 | Cote et al. | 210/85 |

*Primary Examiner*—Joseph W. Drodge
*Attorney, Agent, or Firm*—Michael, Best & Friedrich

[57] ABSTRACT

A water pressure relief apparatus in a traveling water screen adapted to be mounted in a channel such that the traveling water screen filters water flowing through the channel. The channel includes an upstream portion and a downstream portion. The traveling water screen includes a baffle directing water flowing through the traveling water screen and having an upstream surface communicating with the upstream portion of the channel and a downstream surface communicating with the downstream portion of the channel. The baffle has an opening connecting the upstream surface to the downstream surface. The water pressure relief apparatus includes a relief valve adapted to be connected to the baffle. The relief valve has a valve member mounted for movement between an opened position allowing fluid flow through the opening and a closed position engaging the valve seat and sealing the opening against flow therethrough.

9 Claims, 3 Drawing Sheets

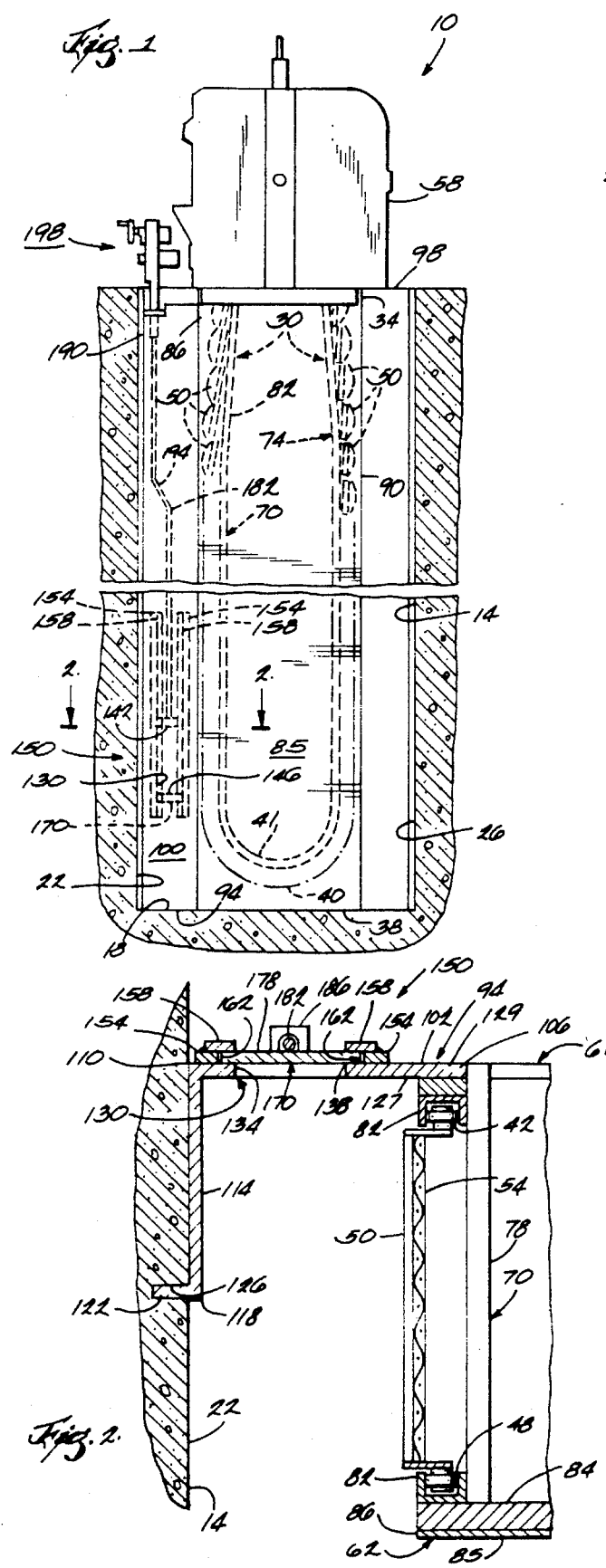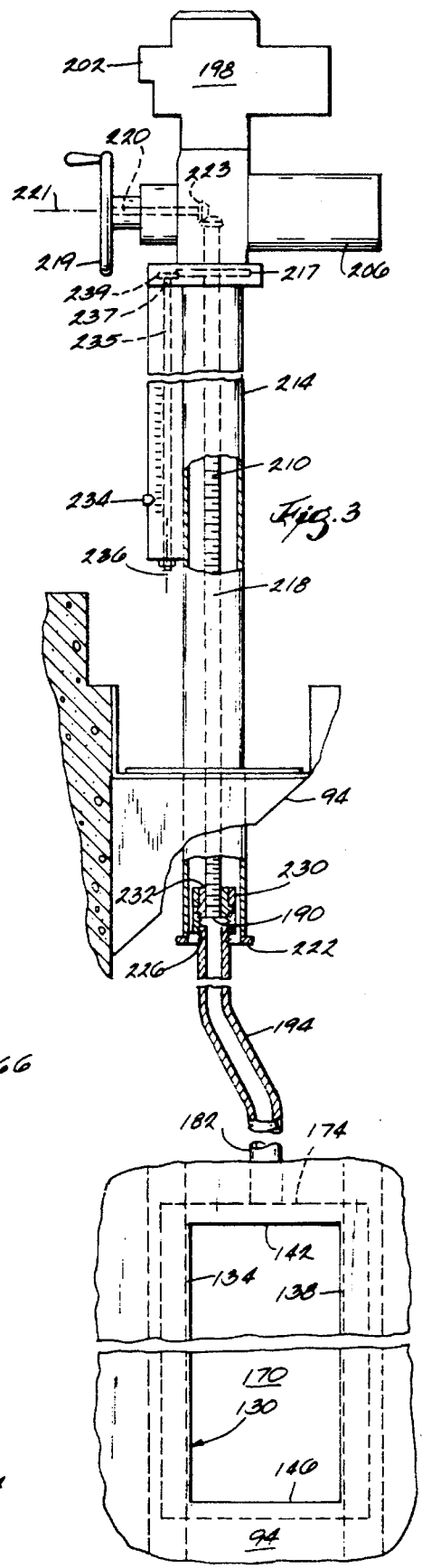

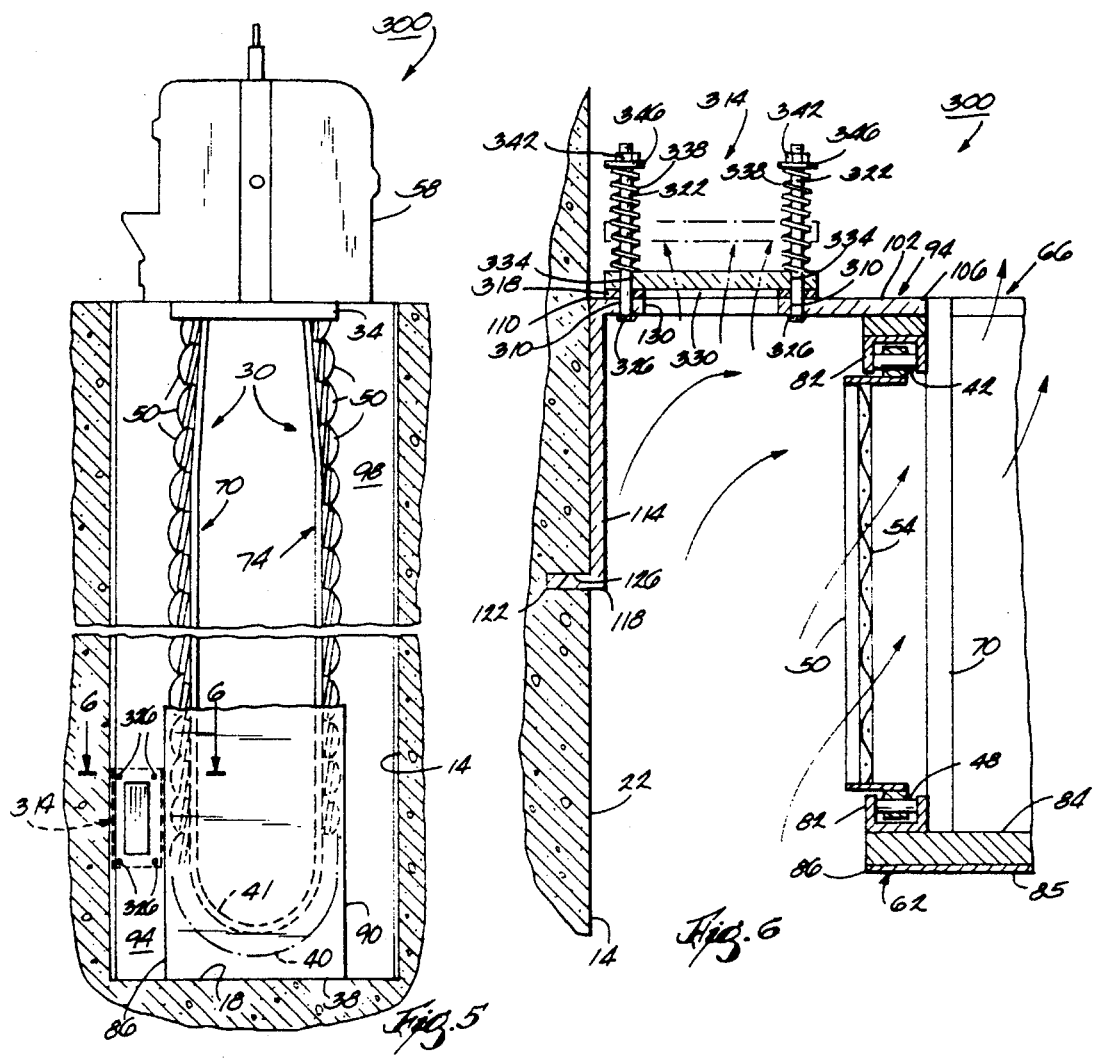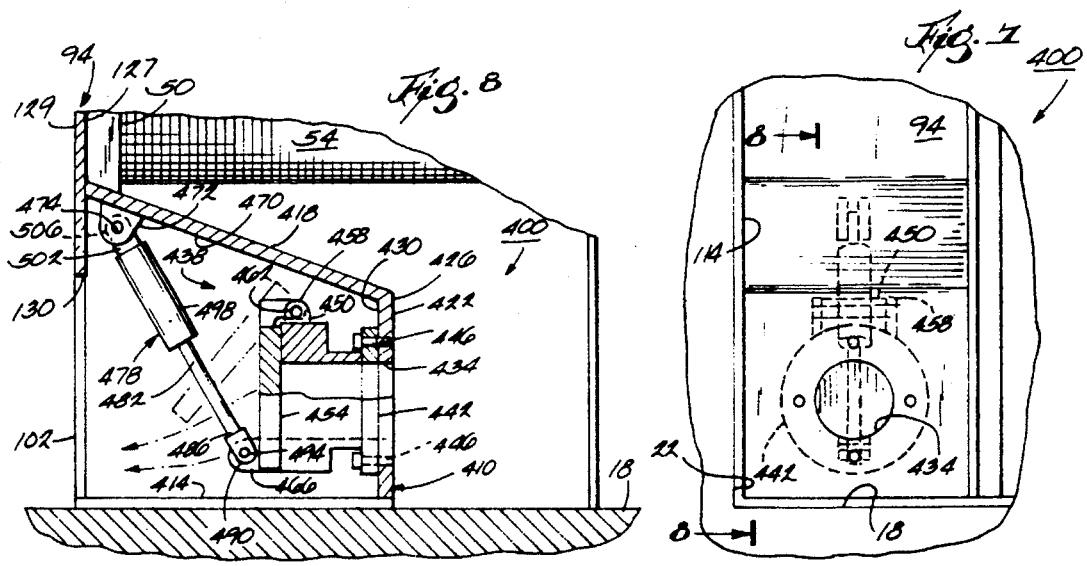

DIFFERENTIAL RELIEF MECHANISM FOR A TRAVELING WATER SCREEN

BACKGROUND OF THE INVENTION

The invention relates to a traveling water screen for filtering the water flowing through a channel. More particularly, the invention relates to an apparatus for regulating the differential water pressure across the traveling water screen.

Power plants, foundries, and other types of industrial facilities are often located near a body of water in order to satisfy their need for water, which is typically used as a coolant. However, water taken from a natural source must be filtered to prevent debris from being taken in with the water.

Typically, traveling water screen filtration units are used to accomplish the desired filtering. A series of channels are positioned in a body of water to direct the flow of water through the channels into the intake ports of the facility. The traveling water screens are mounted in the channel to filter the water flowing through the channel.

A common configuration for a traveling water screen provides a frame having an upstream portion or face, a downstream portion, and opposite side portions connected between the upstream portion and the downstream portion. The frame is centrally positioned in the channel and supports along the side portions first and second vertically extending water screens. Water is directed into the channel around the upstream face of the traveling water screen frame and through the water screens.

It is known in the art to provide a pair of baffles for directing the water flow through the water screens. The baffles are typically connected between the downstream portion of the traveling water screen frame and the channel sidewalls. One such arrangement is shown in U.S. Pat. No. 4,935,131.

It is also known in the art to provide a blow-out panel in the traveling water screen. In the known construction, an opening is provided in the baffle and a removable panel is mounted on the baffle to seal the opening. When the differential pressure across the traveling water screen exceeds a limit beyond which damage to the traveling water screen could result, the water pressure causes the panel is to be permanently blown-off of the baffle to allow water to flow through the opening thereby reducing the differential pressure.

When the differential pressure, and accordingly, the risk of damage to the water screen, has been reduced, a new blow-out panel must be installed to reseal the opening. Installation of the new blow-out panel requires a significant amount of time and effort during which the traveling water screen is not operable.

SUMMARY OF THE INVENTION

The invention provides a dual-flow traveling water screen for filtering the water flowing through a channel. The channel has a bottom and has a pair of opposing sidewalls extending upwardly from the bottom. The traveling water screen includes a frame centrally positioned in the channel between the channel sidewalls and is supported on the bottom of the channel. The frame includes an upstream portion, a downstream portion and a pair of side portions extending between the upstream portion and the downstream portion.

The invention also provides first and second vertically extending water screens supported by the side portions of the frame. The water screens are supported by the frame to filter the water flowing through the channel. A pair of baffles are connected to the frame to secure the traveling water screen in the channel and direct the flow of water through the screens.

The invention also provides a wall structure in the traveling water screen and having an opening therein and a relief valve mounted in the opening. The relief valve includes a valve member mounted for movement relative to the valve seat between an opened position and a closed position. In the opened position, the valve member allows fluid to flow through the opening to reduce the water pressure on the upstream side of the traveling water screen relative to the downstream side of the traveling water screen. In the closed position, the valve member seals the opening against flow therethrough.

In one form of the invention a control apparatus is provided to detect the differential pressure across the baffle and to cause movement of the valve member between the opened and closed positions in response to the detected differential pressure. In one form, the control apparatus is connected to the intake pump to stop the intake pump when the relief valve is open to prevent damage to the pump and to initiate alarms altering operators to the conditions in the channel.

BRIEF DESCRIPTION OF THE DRAWINGS

FIG. 1 is a partial, front elevational view of a traveling water screen including a relief mechanism embodying the invention.

FIG. 2 is an enlarged view taken along line 2—2 in FIG. 1.

FIG. 3 is an enlarged side view with portions cut-away.

FIG. 5 is a partial, front elevational view of a traveling water screen including a relief mechanism that is a first alternative embodiment of the invention.

FIG. 6 is an enlarged view taken along line 6—6 in FIG. 5.

FIG. 7 is an enlarged, partial view of the traveling water screen showing a second alternative embodiment of the invention.

FIG. 8 is a view taken along line 8—8 in FIG. 7.

Figure 4:
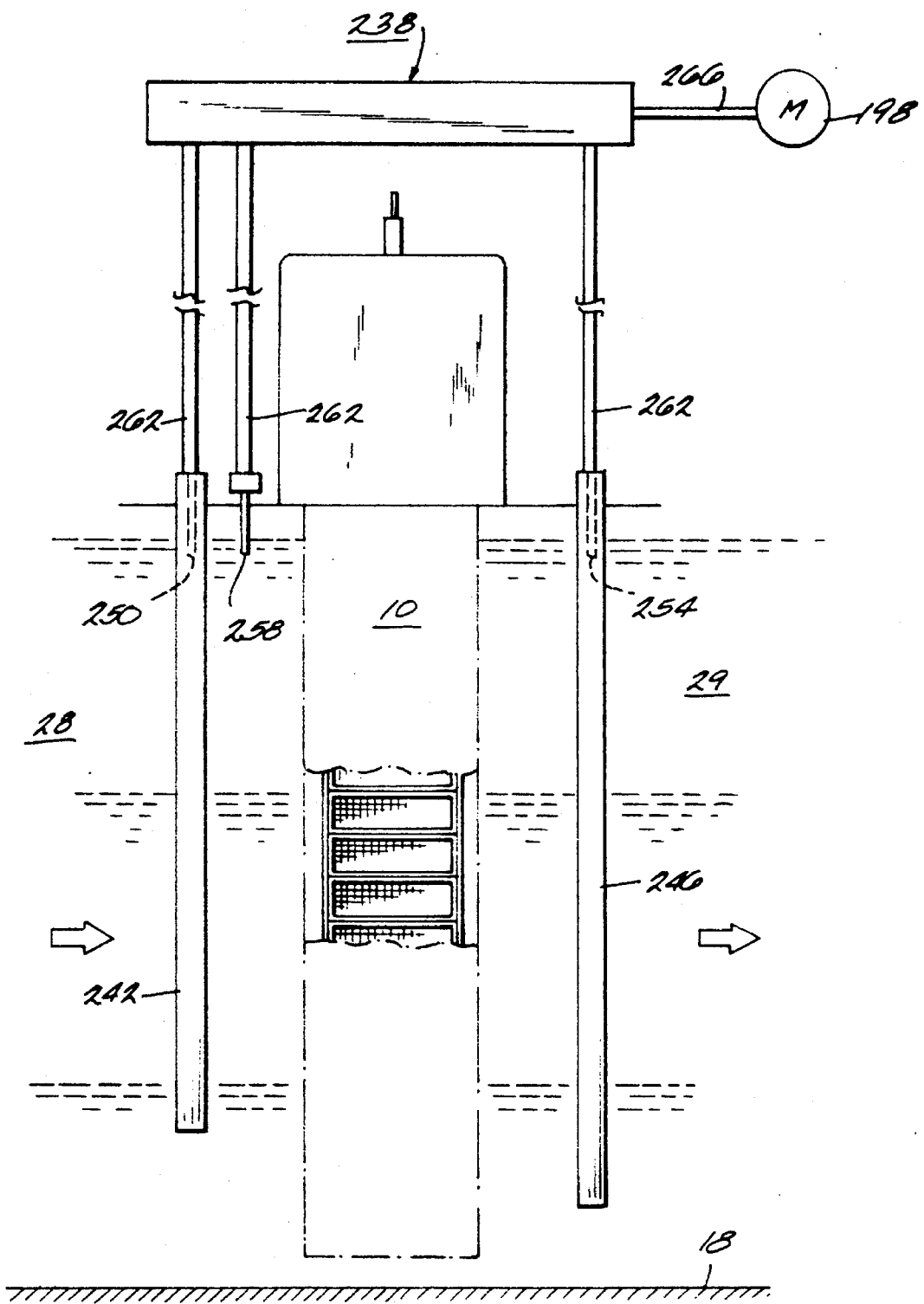
FIG. 4 is a partial side elevational view of the traveling water screen showing the alternative embodiment and including a control apparatus shown schematically.

Before one embodiment of the invention is explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF THE PREFERRED EMBODIMENTS

Illustrated in FIG. 1 of the drawings is a dual-flow traveling water screen 10. The traveling water screen 10 is mounted in a channel 14. The channel 14 includes a bottom 18 and a pair of opposing sidewalls 22 and 26 extending upwardly from the bottom 18. As shown in FIG. 4, the channel 14 also includes an upstream portion 28 and a downstream portion 29. The traveling water screen 10 is between the upstream portion 28 and the downstream portion 29.

The traveling water screen 10 includes a frame 30 which is centrally positioned in the channel 14 and which has upper and lower portions 34 and 38. The lower portion 38 of the frame 30 is supported on the bottom 18 of the channel 14 and defines a boot wrap section 40 including a pair of slide tracks 41 (only one of which is shown in phantom in FIG. 1). The function of the slide tracks 41 will be described in greater detail below. The upper portion 34 supports a shaft (not shown) which has mounted thereon a sprocket assembly (not shown). A pair of continuous carrier chains 42 and 48 (FIG. 2) are trained around the sprocket assembly and around the slide tracks 41 of the boot wrap section 40. The carrier chains 42 and 48 support a plurality of individual traveling water screen baskets 50. Each basket 50 includes a wire screen 54 for filtering debris and aquatic life from water flowing through the wire screen 54. As is known in the art, the traveling water screen 10 includes a motor and drive train assembly (not shown) connected to the upper sprocket assembly so as to drive the baskets 50 in continuous loop fashion around the boot wrap section 40 and the sprockets supported in the upper end 34.

Also included in the traveling water screen 10, is a splash housing 58 through which the traveling water screen baskets 50 pass in order that debris collected during filtering of the water can be effectively cleaned off of the wire screens 54. The particular details of the splash housing 58 form no part of the invention and accordingly, will not be described in greater detail.

Shown in FIG. 2, the traveling water screen frame 30 includes an upstream portion 62, a downstream portion 66, and first and second opposite side portions 70 and 74 (FIG. 1) connected between the upstream portion 62 and the downstream portion 66. The side portions 70 and 74 are mirror images of one another. Accordingly, only the side portion 70 will be shown and described in detail (FIG. 2).

The side portion 70 includes a series of generally horizontal struts 78 that are connected together by a pair of vertically extending tracks 82. The tracks 82 guide the continuous carrier chains 42 and 46 and support the wire screens 54 in the flow of water. The first side portion 70 supports the baskets 50 and wire screens 54 in the flow of water as they travel upwardly with the continuous chains 42 and 46 toward the splash housing 58. The second side portion 74 (FIG. 1 only) supports the baskets 50 and wire screens 54 in the flow of water as they travel downwardly with the continuous chains 42 and 46 after exiting the splash housing 58. The tracks 82 communicate with the slide tracks 41 on the boot wrap section 40 to form a smooth pathway extending from the downstream side of the traveling water screen 10, around the boot wrap section 40 to the upstream side of the traveling water screen 10.

The upstream portion 62 of the frame 30 includes a series of support members 84 (only one of which is shown in FIG. 2) and a generally planar sheet of steel 85 connected to the support members 84. The upstream portion has a first edge 86 and a second edge 90 (FIG. 1 only) adjacent the first side portion 70 and second side portion 74, respectively. The upstream portion forces the water in the channel 14 to flow around the upstream portion and toward the wire screens 54. The downstream portion 66 is preferably a series of support struts (only one of which is shown as 66 in FIG. 2). The support struts are connected between the side portions 70 and 74, allow a substantially free flow of water through the traveling water screen 10, and provide support to the frame 30.

The traveling water screen 10 includes a pair of baffles 94 and 98 (FIG. 1), one of which is connected between the frame 30 and the sidewall 22 and the other of which is connected between the frame 30 and the sidewall 26. The baffles 94 and 98 include a lower portion 100 adjacent the lower portion 38 of the frame and extend vertically from the channel bottom 18 to the upper portion 34 of the frame 30 to secure the traveling water screen 10 in place in the channel 14 and direct the flow of water through the wire screens 54. The baffles 94 and 98 are essentially mirror images of one another. Accordingly, only the baffle 94 will be described in detail.

As shown in FIG. 2, the baffle 94 includes a first, generally planar portion 102 positioned in the channel 14 perpendicular to the flow of water in the channel 14. The first portion 102 includes a first edge 106 connected to the side portion 70 of the frame 30 and a second edge 110, spaced from the frame 30. The baffle 94 also includes a second, generally planar portion 114 connected to the second edge 110 and extending upstream from the second edge 110. The second portion 114 is parallel to the sidewall 22 and has an edge 118 defining a guide member 122. The guide member 122 extends into a groove 126 in the sidewall 22 to secure the traveling water screen 10 in place in the channel 14. The baffles 94 and 98 both have an upstream surface 127 and a downstream surface 129.

The traveling water screen 10 also includes a wall structure having therein an opening 130 communicating between the upstream and downstream channel portions, 28 and 29, respectively. As illustrated in the drawings, the wall structure is the baffle 94. The opening 130 communicates between the upstream surface 127 and the downstream surface 129. The opening 130 has left, right, upper and lower side edges 134, 138, 142, and 146, respectively (FIG. 3). As shown in FIG. 1, the opening 130 is in the lower portion 100 of the baffle 94 because the water pressures are greatest near the bottom 18 of the channel 14.

As shown in FIGS. 1 and 2, the traveling water screen 10 includes a relief valve 150 mounted on the baffle 94 to regulate water flow through the opening 130. As best shown in FIG. 2, the relief valve 150 includes a pair of spaced apart vertical slide tracks 162 on opposite side of opening 130. The slide tracks 162 are formed by a steel bar 154 welded to the baffle 94 adjacent to, but slightly offset from, each side edge 134 and 138, respectively. The bars 154 are parallel to the respective side edges 134 and 138 and extend from below the lower edge 146 to beyond the upper edge 142 (FIG. 1). A stainless steel bar 158 is welded to each bar 154. The stainless steel bars 158 are parallel to and offset from the respective bars 154 so that the pair of parallel slide tracks 162 are formed by the combination of the baffle 94, the bars 154, and the stainless steel bars 158. For reasons explained below, the slide tracks 162 are at least twice the vertical length of the opening 130 and extend upwardly from points below, but relatively close to, the lower edge 146 of the opening 130.

The relief valve 150 also includes a valve member 170. As shown in FIG. 3, the valve member 170 is a generally rectangular sheet of material slightly larger than the opening 130. As shown in FIGS. 2 and 3, the valve member 170 is mounted on the baffle 94 in the slide tracks 162 so that the valve member 170 is vertically movable between a closed position, in which the valve member 170 covers the opening 130 to prevent the flow of water through the opening 130, and an opened position in which water is free to flow through the opening 130. As mentioned above, the slide tracks 162 are at least twice the vertical length of the opening 130 so that the slide tracks 162 support the valve member 170 on the traveling water screen 10 when the valve member 170 is in the opened position (not shown, but preferably above the opening 130).

The valve member 170 has an upper edge 174 (FIG. 3) and a downstream surface 178 (FIG. 2). Referring to FIG. 2, a lifting pipe 182 is connected to the downstream surface 178. Though other means for connecting the lifting pipe 182 to the valve member 170 may be employed, in the embodiment illustrated in FIG. 2, a U-clamp 186 secures the lifting pipe 182 to the valve member 170.

As shown in FIGS. 1 and 3, the lifting pipe 182 extends upwardly from the upper edge 174 of the valve member 170. The lifting pipe 182 includes an upper end 190 and an offset portion 194 between the valve member 170 and the upper end 190. The upper end 190 of the lifting pipe 182 is externally threaded.

The traveling water screen 10 also includes a motorized, non-rising stem apparatus 198 connected to the lifting pipe 182. Referring to FIG. 3, the stem apparatus 198 includes a drive motor 202 connected to a gear train 206. The gear train 206 is drivingly connected to a generally vertical, externally threaded lifting stem 210 supported by a housing 214 for rotation about an axis 218 so that energization of the motor 202 causes automatic (as opposed to manual) rotation of the lifting stem 210 about the axis 218. A gear 217 is connected to the lifting stem 210 for rotation therewith about the axis 218. The purpose of the gear 217 will be described in greater detail below.

The stem apparatus 198 also includes a manual actuator 219 connected to the lifting stem 210 to allow a user to cause manual movement of the lifting stem 210. As shown in FIG. 3, the manual actuator 219 is connected to a drive shaft 220. The drive shaft 220 is supported by the housing 214 for rotation about an axis 221. The drive shaft 220 includes an end 223 spaced from the actuator 219. The end 223 is drivingly connected to the gear train 206 so that manual rotation of the actuator 219 and drive shaft 220 about the axis 221 causes rotation of the lifting stem 210 about the axis 218.

The housing 214 includes a lower end 222 having a downwardly opening aperture 226. The upper end 190 of the lifting pipe 182 extends through the aperture 226 and a nut 230 having an outer diameter larger than the housing aperture 226 is threaded onto the externally threaded end 190 of the lifting pipe 182 so that the nut 230 is fixed to the lifting pipe 182 and so that the end 190 is secured within the housing 214. The nut includes an upper portion or collar 232 which is internally threaded and which is threaded onto the externally threaded lifting stem 210 so that, as the lifting stem rotates about the axis 218, the nut 230 and lifting pipe 182 move upwardly or downwardly relative to the lifting stem and along the axis 218.

The stem apparatus 198 also includes an indicator 234 to indicate to a user the position of the valve member 170 relative to the opening 130. The indicator 234 is drivingly connected to a lifting stem 235 supported within the housing 214 for rotation about a generally vertical axis 236. The lifting stem 235 includes an upper end 237 and a drive gear 239 fixed to the upper end 237. The drive gear 239 is drivingly connected to the gear 217 so that rotation of the lifting stem 210 causes rotation of gear 217, drive gear 239 and lifting stem 235 and causes vertical movement of the indicator 234.

As shown in FIG. 4, the traveling water screen 10 also includes a control apparatus 238 for detecting the differential pressure across the baffle 94 and for energizing the motorized stem apparatus 198 to move the valve member 170 from the closed position to the opened position when the differential pressure exceeds a water pressure limit and to move the valve member 170 from the opened position to the closed position when the differential pressure across the baffle 94 is below the water pressure limit. The control apparatus 238 is a commercially available micro-processor based control system. The control apparatus 238 includes an upstream stilling well 242 mounted in the channel 14 upstream of the traveling water screen 10 and a downstream stilling well 246 mounted in the channel 14 downstream of the traveling water screen 10. A water pressure transducer 250 is mounted in the upstream stilling well 242 to detect the water pressure upstream of the traveling water screen 10. Another water pressure transducer 254 is mounted in the downstream stilling well 246 to detect the water pressure downstream of the traveling water screen 10. In order to detect other various conditions, other transducers such as, for example, a thermometer 258 may also be utilized with the control apparatus 238. The thermometer 258 detects the temperature of the water in the channel 14. The transducers 250, 254 and 258 generate electrical signals based on the detected water pressures and temperature. As is known in the art, the electrical signals generated by the transducers 250 and 254 are transmitted to the control apparatus 238 by conventional electrically conducting cables 262. The control apparatus 238 calculates a differential pressure based on the pressures detected by the transducers. The control apparatus 238 is connected to the stem apparatus 198 by control line 266 (shown schematically in FIG. 4) and energizes the stem apparatus 198 in response to the calculated differential pressure.

In one form of the invention (not shown), the control apparatus 238 is capable of generating remote alarms indicating various operating conditions such as high differential pressures, loss of power to the traveling water screen 10 or loss of water pressure to the splash housing. The control apparatus 238 preferably is also capable of generating a signal to shut down the intake pump (not shown) if the relief valve 150 is open.

In operation, water flows into the channel 14 and around either edge 86 or 90 of the upstream portions 62 of the traveling water screen 10. In the normal operating condition, the valve member 170 is in the closed position and water is directed by the baffles 94 and 98 through the vertically extending wire screens 54. When the control apparatus 238 detects a differential pressure in excess of a selected water pressure limit, the control apparatus 238 energizes the stem apparatus 198 to rotate the lifting stem 210 about the axis 218. As the lifting stem 210 rotates, the threaded engagement between the lifting stem 210 and the lifting pipe 182 cause the lifting pipe 182 to move upwardly thereby forcing the valve member 170 to slide upwardly in the slide tracks 162 from the closed position to the opened position. The increase in the differential pressure is typically a result of an increase in the water flowing through the channel 14 or an increase in debris loading across the screens thereby reducing the flow of water through the screens. With the valve member 170 in the opened position, water flows through the opening 130, bypasses the wire screens 54, and reduces the differential pressure across the traveling water screen 10.

When the differential pressure again drops below the selected limit, the control apparatus 238 energizes the stem apparatus 198 to return the valve member 170 to the closed position once again preventing fluid flow through the opening 130 in the baffle 94 and again allowing the baffles 94 and 98 to direct water flow through the vertically extending wire screens 54.

In one embodiment of the invention the opening 130 is in the steel wall 85 and the relief valve 150 is mounted on the wall 85.

Shown in FIGS. 5 and 6 is a traveling water screen 300 that is first alternative embodiment of the invention. Like parts are identified using like reference numerals. The baffle 94 has therein four through-bores 310 (only two of which are shown in FIG. 6) adjacent the corners of the rectangular opening 130 (FIG. 5).

As best shown in FIG. 6, the traveling water screen 300 also includes a relief valve 314 mounted on the baffle 94 to regulate the flow of water through the opening 130. The relief valve 314 includes a valve seat 318 surrounding the opening 130. Four threaded rods 322 (only two of which are shown in FIG. 6), each having a pan-head 326, extend through the through-bores 310 and through the valve seat 318. The pan-heads 326 engage the upstream surface 127 of the baffle 94 and face in the upstream direction and the threaded rods 322 extend downstream of the baffle 94.

The relief valve 314 also includes a valve member 330 mounted on the threaded rods 322 for movement between an opened position (shown in phantom in FIG. 6) allowing fluid flow through the opening 130 and a closed position engaging the valve seat 318 and sealing the opening 130 against flow therethrough. The valve member 330 is a solid panel and has therein four through-bores 334 (only two of which are shown in FIG. 6). Each of the threaded rods 322 extends through a corresponding bore 334 on the valve member 330 to support the valve member 330 on the baffle 94. When the valve member 330 engages the valve seat 318, fluid flow through the opening 130 is prevented.

The relief valve 314 also includes a helical spring 338 mounted on each of the threaded rods 322 downstream of the valve member 330. A washer or stop member 342 and nut 346 are threaded onto each of the rods 322 to secure the helical spring 338 in place on the rods 322 and provide a mechanism for adjusting the tension of the springs 338. Appropriate tensioning of the springs 338, by adjustment of the nuts 346, effectively sets the water pressure limit at which the valve member 330 is separated from the valve seat 318 to allow fluid to flow through the opening 130.

In operation, water flows into the channel 14 and around either edge 86 or 90 of the upstream portion 62 of the traveling water screen 300. In the normal condition, the valve member 330 is in the closed position and the water is directed by the baffles 94 and 98 through the vertically extending wire screens 54. If the hydraulic pressure upstream of the baffle 94 exceeds, by a selected water pressure limit, the water pressure downstream of the baffle 94 (a result of either extremely large volumes of water flowing through the channel 14 or inhibited flow through the screens as a result of excess debris loading across the screens), the differential pressure across the valve member 330 will force the valve member 330 to slide in a downstream direction on the threaded rods 322 and against the force of the helical springs 338. The valve member 330 is now in the opened position (shown in phantom in FIG. 6) allowing fluid to flow through the opening 130 to reduce the pressure differential across the traveling water screen.

As discussed above, the tension of the helical springs 338 can be adjusted so that the valve member 330 moves in response to a differential pressure above a selected water pressure limit. When the differential water pressure drops below the water pressure limit, the valve member 330 is forced by the helical springs 338 to return to the closed position and once again prevents fluid flow through the opening 130.

FIGS. 7 and 8 illustrate a traveling water screen 400 that is a second alternative embodiment of the invention. Like parts are identified using like reference numerals.

The traveling water screen 400 includes a housing or floor stand assembly 410 connected to the upstream surface 127 of the baffle 94. The floor stand assembly 410 defines a chamber 414 upstream of the opening 130 and includes a top wall 418 and a front wall 422. The front wall 422 has an upstream surface 426 facing the flow of water in the channel 14, a downstream surface 430 partially defining the chamber 414, and a circular opening 434 communicating between the upstream surface 426 and the downstream surface 430.

The traveling water screen 400 also includes a relief valve 438 mounted in the floor stand assembly 410 to regulate the flow of water through the opening 434. The relief valve 438 includes an annular valve seat 442 mounted on the downstream surface 430 of the front wall 422. The valve seat 442 is secured to the front wall 422 by a series of bolts 446 (only two of which are shown in FIG. 8). The valve seat 442 includes a support member 450 extending vertically from the top of the valve seat 442. A bore (not shown) extends horizontally through the support member 450.

The relief valve 438 also includes an annular valve member 454 pivotally connected to the valve seat 442 for movement between an opened position allowing fluid to flow through the opening 434 in the floor stand assembly 410 and, subsequently, through the opening 130 in the baffle 94, and a closed position wherein the valve member 454 engages the valve seat 442 to seal the opening 434 against flow of water therethrough. The valve member 454 includes a clevis 458 (FIG. 7) which receives therein the support member 450 on the annular valve seat 442. A pin 462 (FIG. 8) extends through the clevis 458 and the support member 450 to pivotally connect the valve member 454 to the valve seat 442. The valve member 454 also includes a projection 466 mounted on the valve member 454 near the bottom 18 of the channel 14. The purpose of the projection 466 will be described in greater detail below.

The top wall 418 of the floor stand assembly 410 has an inner surface 470. A clevis 472 is mounted on the inner surface 470 and, as is known in the art, a through-bore 474 (only one of which is shown in FIG. 8) extends through each projection of the clevis 472.

As best shown in FIG. 8, the traveling water screen also includes a fluid cylinder motor 478 connected between the clevis 472 and the projection 466 on the valve member 454. The fluid cylinder motor 478 includes a piston 482 having an end 486 with a clevis 490 mounted on the end 486. The clevis 490 is connected by a pivot pin 494 to the projection 466 on the valve member 454. The piston 482 slides telescopically within a fluid-filled cylinder 498. The cylinder 498 has an end 502 opposed to the end 486 on the piston 482. The cylinder end 502 includes a projection 506 having therein a through-bore (not shown). The projection 506 is received in the clevis 472 and is pivotally secured to the clevis 472 by a pivot pin 510.

As with the relief valve 150 in the traveling water screen 10, the relief valve 438 is preferably connected to the control apparatus 238 (FIG. 4) which energizes the fluid cylinder motor 478 (not shown in FIG. 4) to cause movement of the valve member 454 between the opened and closed positions.

In operation, water flows into the channel 14 and around either edge 86 or 90 of the upstream portion 62 of the traveling water screen 400. In the normal operating condition, the valve member 454 is in the closed position and water is directed by the baffles 94 and 98 through the vertically extending wire screens 54. When the control apparatus 238 detects a differential pressure in excess of a selected water pressure limit, the fluid cylinder motor 478 is energized to move the valve member 454 from the closed position to the opened position. With the valve member 454 in the opened position, water flows through the opening 434 in the floor stand assembly 410 and through the opening 130 in the baffle 94 thereby bypassing the wire screens 54 and reducing the differential pressure across the traveling water screen 400. When the differential pressure again drops below the selected limit, the control apparatus 238 energizes the fluid cylinder motor 478 to return the valve member 454 to the closed position once again preventing fluid flow through the opening 434 in the floor stand assembly 410 and through the opening 130 in the baffle 94 and again allowing the baffles 94 and 98 to direct the water flow through the vertically extending wire screens 54.

Various features of the invention are set forth in the following claims.

What is claimed is:

1. A traveling water screen adapted to be mounted in a channel having side walls and a bottom, and having water flowing through the channel, the traveling water screen comprising:

a frame positioned in the channel;

a water screen supported by the frame for screening water flowing through the channel;

a baffle connected to the frame and to one of the side walls of the channel, the baffle including an upstream surface, a downstream surface and an opening connecting the upstream surface and the downstream surface, said baffle including a lower portion adjacent the bottom of the channel, and further including a floor stand assembly that is adapted to be connected to the bottom of the channel and that is connected to the lower portion of the baffle; and a relief valve connected to the baffle, the relief valve including a valve member, the valve member being mounted for movement between a closed position wherein the valve member prevents flow of water through the opening, and an opened position allowing flow of water through the opening, the relief valve being mounted so that the valve member moves to the opened position whenever the water pressure in the channel upstream of the baffle exceeds, by a selected water pressure limit, the water pressure downstream of the baffle and closing means connected to the valve member and for causing movement of the valve member to the closed position whenever the difference between the water pressure upstream of the baffle and the water pressure downstream of the baffle is less than the selected water pressure limit, wherein the relief valve is mounted in the floor stand assembly and includes a valve seat, and wherein the valve member is mounted for pivotal movement relative to the valve seat.

2. A traveling water screen adapted to be mounted in a channel having side walls and a bottom, and having water flowing through the channel, the traveling water screen comprising:

a frame positioned in the channel;

a water screen supported by the frame for screening water flowing through the channel;

a baffle connected to the frame and to one of the side walls of the channel, the baffle including an upstream surface, a downstream surface and an opening connecting the upstream surface and the downstream surface and further including a floor stand assembly connected to the baffle;

a relief valve mounted in the floor stand assembly, said relief valve including a valve member, the valve member being mounted for movement between a closed position wherein the valve member prevents flow of water through the opening, and an opened position allowing flow of water through the opening, the relief valve being mounted so that the valve member moves to the opened position whenever the water pressure in the channel upstream of the baffle exceeds, by a selected water pressure limit, the water pressure downstream of the baffle and closing means connected to the valve member and for causing movement of the valve member to the closed position whenever the difference between the water pressure upstream of the baffle and the water pressure downstream of the baffle is less than the selected water pressure limit, said closing means including a fluid cylinder motor connected between the valve member and the floor stand assembly to cause movement of the valve member between the opened and closed positions.

3. A traveling water screen adapted to be mounted in a channel having side walls and a bottom, and having water flowing through the channel, the traveling water screen comprising:

a frame positioned in the channel;

a water screen supported by the frame for screening water flowing through the channel;

a baffle connected to the frame and to one of the side walls of the channel, the baffle including an upstream surface, a downstream surface and an opening connecting the upstream surface and the downstream surface;

a relief valve connected to the baffle, the relief valve including a valve member, the valve member being mounted for movement between a closed position wherein the valve member prevents flow of water through the opening, and an opened position allowing flow of water through the opening, the relief valve being mounted so that the valve member moves to the opened position whenever the water pressure in the channel upstream of the baffle exceeds, by a selected water pressure limit, the water pressure downstream of the baffle and closing means connected to the valve member and for causing movement of the valve member to the closed position whenever the difference between the water pressure upstream of the baffle and the water pressure downstream of the baffle is less than the selected water pressure limit;

means for detecting the difference between the water pressure upstream of the baffle and the water pressure downstream of the baffle; and means for energizing the closing means to move the valve member in response to the detected differential pressure.

4. A traveling water screen adapted to be mounted in a channel having side walls and a bottom, and having water flowing through the channel, the traveling water screen comprising;

a frame positioned in the channel;

a water screen supported by, the frame for screening water flowing through the channel;

a baffle connected to the frame and to one of the side walls of the channel, the baffle including an upstream surface, a downstream surface and an opening connecting the upstream surface and the downstream surface; and a relief valve connected to the baffle, the relief valve including a valve member, said relief valve including a plurality of guide posts mounted in spaced relation to one another about the periphery of the opening, each guide post extending downstream in the channel, said valve member including a pressure plate supported by the guide posts for movement between the opened and closed positions, the valve member being mounted for movement between the closed position wherein the valve member prevents flow of water through the opening, and the opened position allowing flow of water through the opening, the relief valve being mounted so that the valve member moves to the opened position whenever the water pressure in the channel upstream of the baffle exceeds, by a selected water pressure limit, the water pressure downstream of the baffle and closing means connected to the valve member and for causing movement of the valve member to the closed position whenever the difference between the water pressure upstream of the baffle and the water pressure downstream of the baffle is less than the selected water pressure limit.

5. A traveling water screen as set forth in claim 4 further comprising closing means including a helical spring mounted on at least one of the guide posts to prevent movement of the valve member from the closed position when the differential pressure is below the selected water pressure limit, to permit movement of the valve member from the closed position to the opened position when the pressure differential is above the selected water pressure limit, and to cause movement of the valve member from the opened position to the closed position when the pressure differential is below the selected water pressure limit.

6. A traveling water screen as set forth in claim 5 wherein the guide posts each include a downstream end having a stop member and wherein each of the at least one helical spring is mounted on one the guide posts between the pressure plate and the stop member.

7. A traveling water screen adapted to be mounted in a channel having side walls and a bottom, and having water flowing through the channel, the traveling water screen comprising;

a frame positioned in the channel;

a water screen supported by the frame for screening water flowing through the channel;

a baffle connected to the frame and to one of the side walls of the channel, the baffle including an upstream surface, a downstream surface and an opening connecting the upstream surface and the downstream surface, said opening having opposite sides and having opposed slide channels mounted on the opposite sides of the opening to support the valve member on the baffle; and a relief valve connected to the baffle, the relief valve including a valve member, the valve member being mounted for movement between a closed position wherein the valve member prevents flow of water through the opening, and an opened position allowing flow of water through the opening, the relief valve being mounted so that the valve member moves to the opened position whenever the water pressure in the channel upstream of the baffle exceeds, by a selected water pressure limit, the water pressure downstream of the baffle and closing means connected to the valve member and for causing movement of the valve member to the closed position whenever the difference between the water pressure upstream of the baffle and the water pressure downstream of the baffle is less than the selected water pressure limit.

8. A traveling water screen as set forth in claim 7 wherein the valve member includes opposite side portions slidably housed in the slide channels so that the valve member is vertically movable relative to the opening when moved between the opened and closed positions.

9. A traveling water screen adapted to be mounted in a channel having side walls and a bottom, and having water flowing through the channel, the traveling water screen comprising:

a frame positioned in the channel;

a water screen supported by the frame for screening water flowing through the channel;

a baffle connected to the frame and to one of the side walls of the channel, the baffle including an upstream surface, a downstream surface and an opening connecting the upstream surface and the downstream surface; and a relief valve connected to the baffle, the relief valve including a valve member, the valve member being mounted for movement between a closed position wherein the valve member prevents flow of water through the opening and an opened position allowing flow of water through the opening, the relief valve being mounted so that the valve member moves to the opened position whenever the water pressure in the channel upstream of the baffle exceeds, by a selected water pressure limit, the water pressure downstream of the baffle and closing means connected to the valve member and for causing movement of the valve member to the closed position whenever the difference between the water pressure upstream of the baffle and the water pressure downstream of the baffle is less than the selected water pressure limit, said closing means including a lifting member connected to the valve member and extending upwardly from the valve member such that upward movement of the lifting member causes vertically upward movement of the valve member from the closed position to the opened position and such that a downward force applied to the lifting member causes downward movement of the valve member from the opened position to the closed position.

\* \* \* \* \*